United States Patent
Lui et al.

(10) Patent No.: US 7,337,390 B2
(45) Date of Patent: Feb. 26, 2008

(54) METHOD AND SYSTEM FOR EMBEDDING VOICE NOTES

(75) Inventors: Charlton E. Lui, Redmond, WA (US); Jeff Blum, Seattle, WA (US); Michael Jay Parks, Kirkland, WA (US); Kevin Phillip Paulson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 736 days.

(21) Appl. No.: 10/791,964

(22) Filed: Mar. 2, 2004

(65) Prior Publication Data

US 2004/0185911 A1  Sep. 23, 2004

Related U.S. Application Data

(62) Division of application No. 09/516,572, filed on Mar. 1, 2000, now Pat. No. 6,720,980.

(51) Int. Cl.
*G06F 17/00* (2006.01)

(52) U.S. Cl. ............... 715/512; 455/563; 715/526

(58) Field of Classification Search ........... 704/270; 715/512
See application file for complete search history.

(56) References Cited

U.S. PATENT DOCUMENTS

| | | | | |
|---|---|---|---|---|
| 5,333,266 A | * | 7/1994 | Boaz et al. | 709/206 |
| 5,351,276 A | * | 9/1994 | Doll et al. | 379/88.17 |
| 5,390,138 A | * | 2/1995 | Milne et al. | 381/119 |
| 5,481,645 A | * | 1/1996 | Bertino et al. | 704/270 |
| 5,524,193 A | * | 6/1996 | Covington et al. | 715/512 |
| 5,557,659 A | * | 9/1996 | Hyde-Thomson | 379/88.13 |
| 5,600,775 A | * | 2/1997 | King et al. | 715/500 |
| 5,625,833 A | * | 4/1997 | Levine et al. | 715/500 |
| 5,699,089 A | * | 12/1997 | Murray | 715/823 |
| 5,749,908 A | * | 5/1998 | Snell | 607/30 |
| 5,794,205 A | | 8/1998 | Walters et al. | |
| 5,802,314 A | | 9/1998 | Tullis et al. | |
| 5,838,313 A | * | 11/1998 | Hou et al. | 715/500.1 |
| 5,970,455 A | * | 10/1999 | Wilcox et al. | 704/270 |
| 6,021,181 A | | 2/2000 | Miner et al. | |
| 6,038,199 A | | 3/2000 | Pawlowski et al. | |
| 6,222,909 B1 | * | 4/2001 | Qua et al. | 379/88.22 |
| 6,266,400 B1 | | 7/2001 | Castagna | |
| 6,292,782 B1 | | 9/2001 | Weideman | |
| 6,438,524 B1 | | 8/2002 | Shi | |
| 6,483,899 B2 | | 11/2002 | Agraharam et al. | |
| 6,532,005 B1 | | 3/2003 | Campbell | |
| 6,538,666 B1 | | 3/2003 | Ozawa et al. | |
| 6,570,588 B1 | | 5/2003 | Ando et al. | |

(Continued)

*Primary Examiner*—Doug Hutton
*Assistant Examiner*—Gregory A DiStefano
(74) *Attorney, Agent, or Firm*—Merchant & Gould P.C.

(57) ABSTRACT

A method of embedding voice data in a computing system includes detecting a record event and detecting if a software application currently running on the computing system is voice-aware. The method also includes embedding the voice data within associated data in the software application, if the software application is voice-aware. If the software application is not voice-aware, the method also includes triggering a voice note application to record and store the voice data. A method in a computing system for modifying a user interface displayed on a display device includes receiving an indication from the computing device to modify the user interface. The method further includes displaying an identification block, a record toolbar, a note pad, and a note tab.

10 Claims, 4 Drawing Sheets

U.S. PATENT DOCUMENTS

| | | |
|---|---|---|
| 6,571,211 B1 | 5/2003 | Dwyer et al. |
| 6,608,972 B1 | 8/2003 | Lemelson et al. |
| 6,720,980 B1 | 4/2004 | Lui et al. |
| 2002/0099552 A1* | 7/2002 | Rubin et al. ................ 704/270 |

* cited by examiner

METHOD AND SYSTEM FOR EMBEDDING VOICE NOTES

This application is a divisional of U.S. patent application Ser. No. 09/516,572, filed Mar. 1, 2000, now U.S. Pat. No. 6,720,980 which application is incorporated herein by reference.

TECHNICAL FIELD

The present invention relates to voice recording and more particularly to embedding voice recording within particular applications.

BACKGROUND

In some instances, computing devices, such as handheld personal computers and palm-size personal computers, are capable of recording voice notes for later retrieval. Such computing devices typically include a voice recording application for recording the voice, playing it back, and storing the voice notes. The voice recording application typically includes a tool bar having software buttons relating to play, stop, pause, fast forward, rewind, and record, along with a list view displaying all of the recorded voice notes.

When a user chooses to record a voice note, the user either presses a hardware record button or a software record button within the voice record application. Typically, the hardware record button is wired to execute the voice recording application and to push the software record button within the voice recording application. The voice record application records the voice until the button is depressed. The voice recording application saves the voice note as a file and stores the file for later retrieval by the user. Typically, the file is stored within a central directory. The voice record application includes a list view that displays the voice files for the user's information. If the user wishes to play back one of the voice notes, the user finds the voice note from the view list, selects the voice note, i.e. by highlighting the voice note, and selects play. The voice recording application plays the voice note back to the user.

Such systems have disadvantages. One such disadvantage is that the storage of the voice notes is in the central directory. This is inconvenient for the user. The list view lists all the voice recordings stored within the system, making organization of the voice notes difficult. Another disadvantage of such systems is that a user cannot associate the voice note with other data. For example, if the user is viewing a person's contact information and records a voice note regarding directions to the person's house, the voice note is stored within the central directory, not with the contact information. Therefore, improvements are desirable.

SUMMARY

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

In one aspect of the present invention, a method of embedding voice data in a computing system is provided. The method includes detecting a record event and detecting if a software application currently running on the computing system is voice-aware. The method also includes embedding the voice data within associated data in the software application, if the software application is voice-aware. If the software application is not voice-aware, the method also includes triggering a voice note application to record and store the voice data.

Another aspect of the present invention includes a system for embedding voice data in a computing system. The system includes a detect module, a top-level module, an embed module, and a trigger module. The detect module detects a record event. The top-level module detects if a software application currently running on the computing system is voice-aware. The embed module embeds the voice data within associated data in the software application, if the software application is voice-aware. The trigger module triggers a voice note application to record and store the voice data, if the application is not voice-aware.

In another aspect, a computer program product readable by a computing system and encoding instructions for a computer process for a embedding a voice note in a computing system is provided. The computer process is analogous to the method described above.

In another aspect, a method in a computing system for modifying a user interface displayed on a display device is provided. The method includes receiving an indication from the computing device to modify the user interface. The method further includes displaying an identification block, a record toolbar, a note pad, and a note tab.

In another aspect, a display device having rendered thereon a user interface for displaying an embedded voice note is provided. The display device includes an identification block, a record tool bar, a note pad, and a note tab.

A more complete appreciation of the present invention and its scope may be obtained from the accompanying drawings, which are briefly described below, from the following detailed descriptions of presently preferred embodiments of the invention and from the appended claims.

DETAILED DESCRIPTION

In the following description of preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

Figure 1:
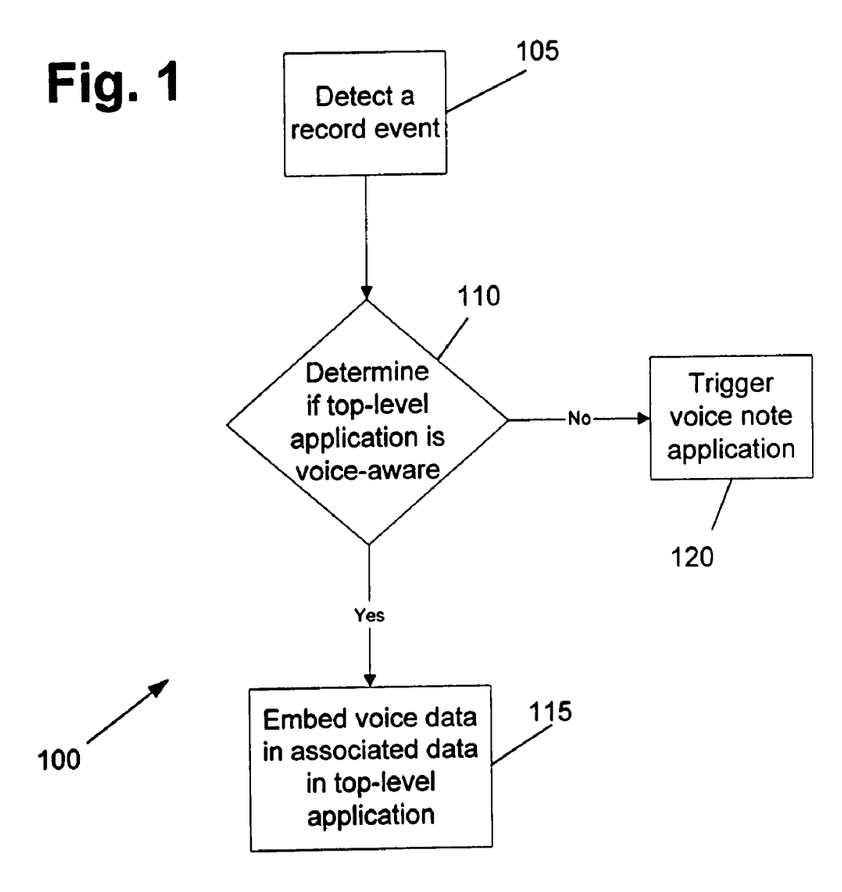
FIG. 1 is a schematic representation of methods and system for embedding voice notes, according to an embodiment of the present invention.

In general, the present disclosure describes methods and systems for embedding voice notes with other data, preferably within the same file in a format readable and usable by the current running application. Referring now to FIG. 1, an embedding system 100 for embedding voice notes with associated data is shown. A detect module 105 detects a record event. An aware operation 110 determines if the top-level application is voice-aware. If the top-level application is voice aware, an embed module 115 embeds the voice data within the associated data in the top-level application. If the top-level application is not voice aware, a trigger module 120 triggers a voice note application.

Figure 2:
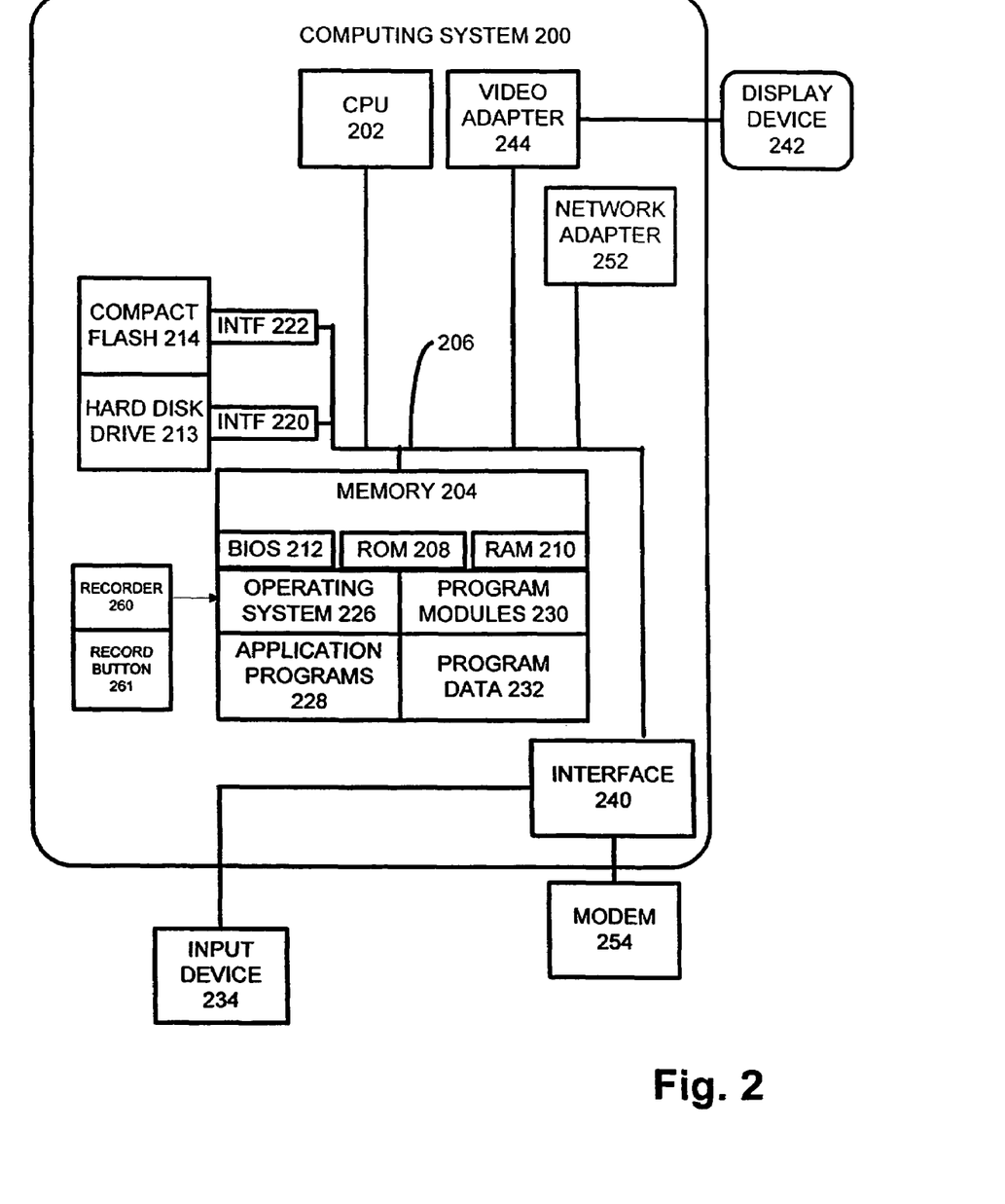
FIG. 2 is a schematic representation of a computing system that may be used to implement aspects of the present invention.

Referring now to FIG. 2, an exemplary environment for implementing embodiments of the present invention includes a general purpose computing device in the form of a computing system 200, such as a handheld, or palm-size computer, or pocket personal computer, including at least one processing system 202. A variety of processing units are available from a variety of manufacturers, for example, Intel or Advanced Micro Devices. The computing system 200 also includes a system memory 204, and a system bus 206 that couples various system components including the system memory 204 to the processing unit 202. The system bus 206 might be any of several types of bus structures including a memory bus, or memory controller; a peripheral bus; and a local bus using any of a variety of bus architectures.

Preferably, the system memory 204 includes read only memory (ROM) 208 and random access memory (RAM) 210. A basic input/output system 212 (BIOS), containing the basic routines that help transfer information between elements within the computing system 200, such as during start-up, is typically stored in the ROM 208.

Preferably, the computing system 200 further includes a secondary storage device 213, such as a hard disk drive, for reading from and writing to a hard disk (not shown), and a compact flash card 214.

The hard disk drive 213 and compact flash card 214 are connected to the system bus 206 by a hard disk drive interface 220 and a compact flash card interface 222, respectively. The drives and cards and their associated computer-readable media provide nonvolatile storage of computer readable instructions, data structures, program modules and other data for the computing system 200.

Although the exemplary environment described herein employs a hard disk drive 213 and a compact flash card 214, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk 213, compact flash card 214, ROM 208, or RAM 210, including an operating system 226, one or more application programs 228, other program modules 230, and program data 232. A user may enter commands and information into the computing system 200 through an input device 234. Examples of input devices might include a keyboard, mouse, microphone, joystick, game pad, satellite dish, scanner, and a telephone. These and other input devices are often connected to the processing unit 202 through an interface 240 that is coupled to the system bus 206. These input devices also might be connected by any number of interfaces, such as a parallel port, serial port, game port, or a universal serial bus (USB). A display device 242, such as a monitor, is also connected to the system bus 206 via an interface, such as a video adapter 244. The display device 242 might be internal or external. In addition to the display device 242, computing systems, in general, typically include other peripheral devices (not shown), such as speakers, printers, and palm devices.

When used in a LAN networking environment, the computing system 200 is connected to the local network through a network interface or adapter 252. When used in a WAN networking environment, such as the Internet, the computing system 200 typically includes a modem 254 or other means, such as a direct connection, for establishing communications over the wide area network. The modem 254, which can be internal or external, is connected to the system bus 206 via the interface 240. In a networked environment, program modules depicted relative to the computing system 200, or portions thereof, may be stored in a remote memory storage device. It will be appreciated that the network connections shown are exemplary and other means of establishing a communications link between the computing systems may be used.

Preferably, the computing system 200 also includes a recorder 260 connected to the memory 204. The recorder 260 includes a microphone for receiving sound input and is in communication with the memory 204 for buffering and storing the sound input. Preferably, the recorder 260 also includes a record button 261 for activating the microphone and communicating the sound input to the memory 204.

Figure 3:
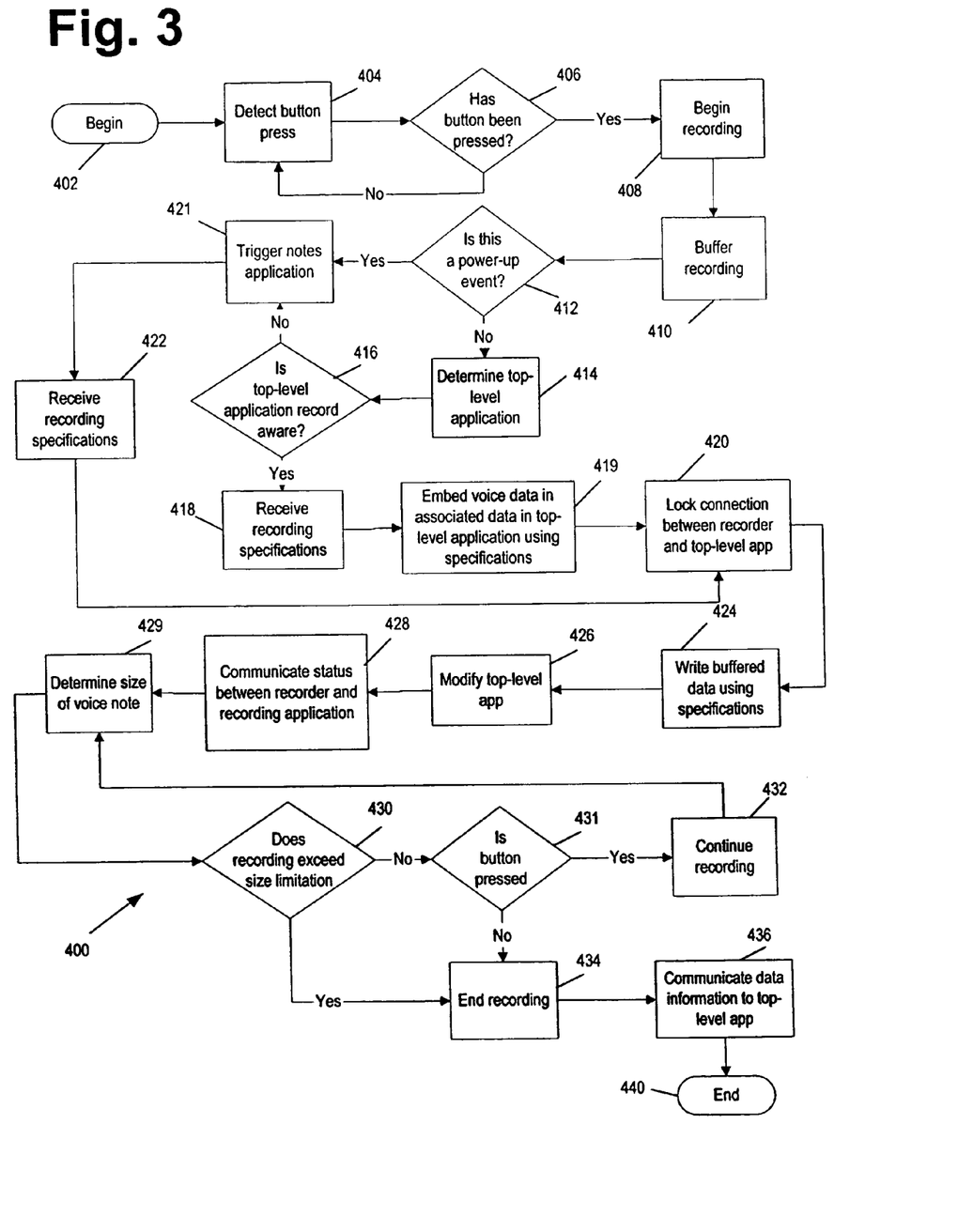
FIG. 3 is a flow chart illustrating the logical operations of the methods and systems of FIG. 3.

FIG. 3 is a flow chart representing logical operations of an embedding system 400 for embedding voice notes with associated data, according to another embodiment. Entrance to the operational flow of the embedding system 400 begins at a flow connection 402. A detect module 404 detects if a record button has been pressed. Typically, palm-sized computers include a hardware record button. Preferably, the detect module 404 detects if a hardware record button has been pressed. Alternatively, the detect module 404 detects if a software record button has been pressed within a software application running on the computing system including the embedding system 400.

A detect operation 406 detects a record event, or in other words if the record button has been pressed. If the record button has not been pressed, operational flow branches "NO" to the detect module 404. If the record button has been pressed, operational flow branches "YES" to a record module 408. Preferably, the record module 408 begins recording the voice note. A buffer module 410 causes the voice note to be recorded into a buffer, or a temporary storage location. The buffer module 410 buffers the voice data because it has not yet received the appropriate information from the top-level application regarding the voice note, as will be explained in more detail below, and because some storage devices, such as compact flash cards, require some time period to "wake-up." In other words, in order to save power, a device might be turned off until it is needed at which time it is turned on or "woken-up."

A power-up operation 412 determines if the record button was pressed during a power-off state. If the power-up operation determines that the record button was not pressed during a power-off state, operational flow branches "NO" to a top-level module 414. The top-level module 414 determines what software application is currently running. By the term "currently running," it is meant the software application that is actively running In a windows execution environment, several windows may be open at once, but only one window is actually is in an active state. By the term "active state," it is meant the window within which the user may make modifications within the software application. Typically, the windows execution environment allows multi-processing, but only allows one window to be modified at a time by a user. For example, a user might have a window open for a word processing application, another window for a spreadsheet application, and a third window for a navigation application for navigating the Internet. The user can only have one of these three windows active at a time. The user might select a hyperlink in the navigation application. Clicking within the navigation application causes that window to become active. After selecting the hyperlink, the user might wish to work in the spreadsheet application while waiting for the web page to load in the navigation application. Clicking in the spreadsheet application window causes the spreadsheet application window to become active, while causing the navigation application window to become de-active. However, the de-active navigation application is still running.

In some instances, particularly with small devices, the execution environment has only one application running on top. This "top-level" application is the currently running application. The embedding system 400 assumes that the user intended to associate the voice note with data contained within the current running top-level application.

An aware operation 416 determines if the top-level application is voice aware. By the term "voice-aware," it is meant that the top-level application is adapted to receive and embed voice notes. In some instances, a top-level application might be voice-aware in certain configurations or modes but not in others. For example, during creation of a new database record, the top-level application might not be able to receive voice notes. The aware operation 416 determines by communicating with the top-level application, or in other words by querying the top-level application and receiving a response to the query. If the aware operation 416 determines that the top-level application is voice aware, operational flow branches "YES" to a receive module 418.

The receive module 418 queries the top-level application, which may be the voice recording application, for specifications regarding recording the voice note. Example specifications include maximum size limit, file format, and file location.

An embed module 419 embeds the voice data in associated data in the top-level application using the specification received by the receive module 418. For example, in a contacts application, a user has several different contacts. If the user has a contact open for a particular person and begins recording a voice note, the voice note is embedded within the contact data for that particular person. Preferably, the embedding system 400 provides an indication to the user that a voice note is embedded, for example by placing a speaker within the contact data where the voice note was recorded. By the term "embed," it is meant that the voice data is placed within the contact information and is saved within the same file where the contact information is saved. Thus, one file contains both text data and voice data. In this fashion, the embedding system 400 embeds the voice data with the data the user is currently working with, helping to organize the voice data for later retrieval. Operational flow proceeds to a lock module 420.

Referring back to the aware operation 416, if the aware operation 416 determines that the top-level application is not voice aware, operational flow branches "NO" to a trigger module 421. The trigger module 421 begins execution of a voice recording application. If the top-level application is not capable of receiving embedded voice notes, the voice recording application is executed to receive the voice note. The voice recording application will store the voice note in a central directory. Operational flow branches to a specifications module 422. The specifications module 422 queries the top-level application, which may be the voice recording application, for specifications regarding recording the voice note. Example specifications include maximum size limit, file format, and file location. Operational flow proceeds to the lock module 420.

A lock module 420 locks the connection between the recorder and the top-level application. Thus, once recording begins, the voice note is associated with data contained within the top-level application. The association is locked so that if the user switches applications while recording, the voice note does not lose its connection to the previous top-level application. The embedding system 400 assumes the user intended to associate the voice note with data that was present in the top-level application at the time the user began the voice note. Operational flow proceeds to a write module 424.

Figure 4:
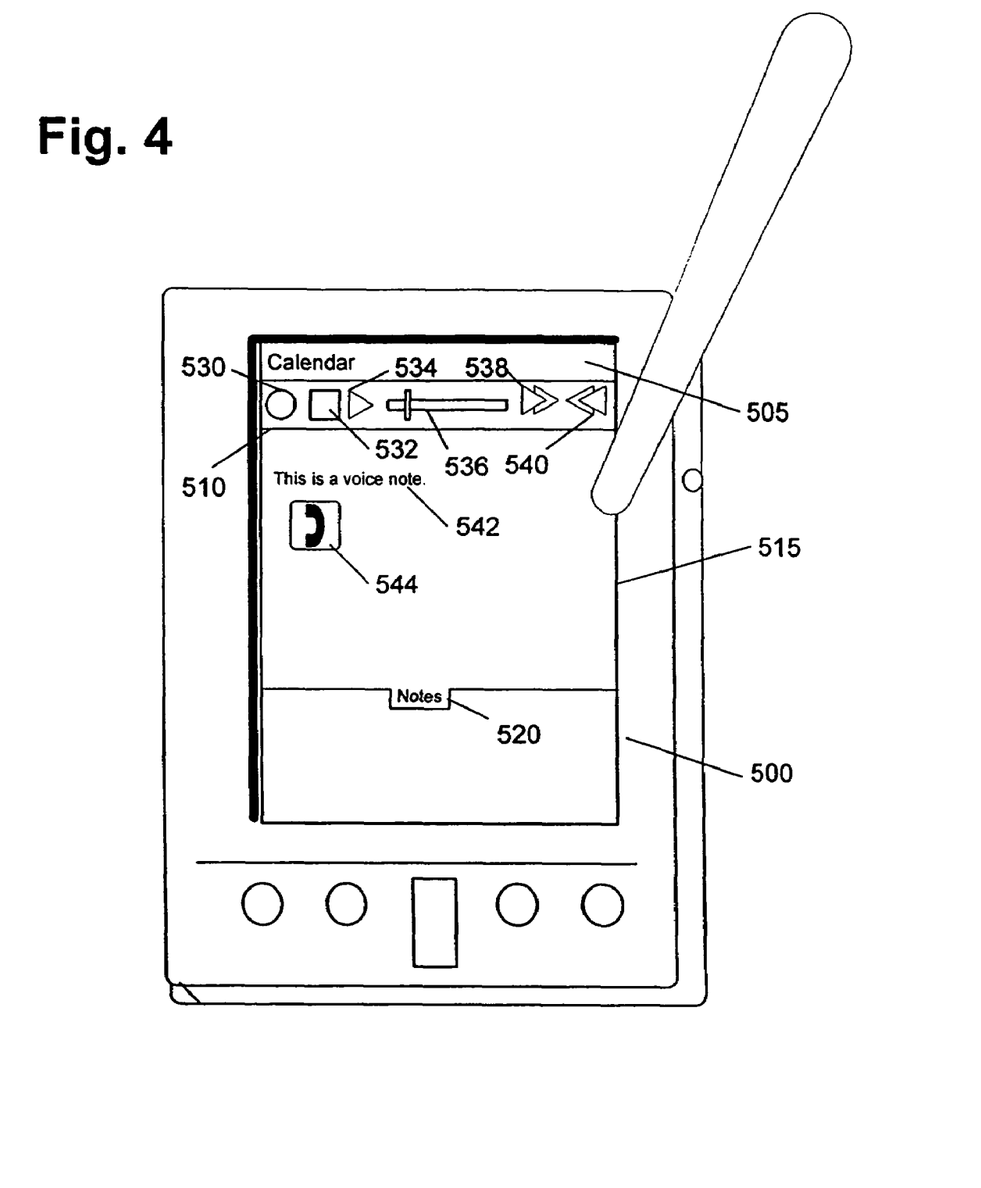
FIG. 4 is a schematic representation of a user interface for the computing system of FIG. 2, according to an embodiment of the present invention.

The write module 424 writes the voice note data using the specifications received by the receive module 418 while the record module 408 continues to record. A modify module 426 modifies the top-level application as desired by the top-level application. Referring to FIG. 4, for example, once voice recording begins, it might be desirable to modify a user interface 500 to show the user the status of the recording. Preferably, the record user interface 500 includes an identification block 505, a recording toolbar 510, a note pad 515, and a notes tab 520.

The identification block 505 identifies the active application for the user. The recording toolbar 510 includes tools for recording a voice note. Typically, these tools include a record button 530, a stop button 532, a play button 534, a status bar 536, a fast forward button 538, and a rewind button 540. The status bar 536 illustrates the relative length of the recording. The note pad 515 displays a note 540 for the user. The note 540 might contain a combination of a text note 542 and an icon 544 for a voice note. The user can listen to the voice note 544 by selecting the icon 544 and pressing the play button 534. The voice note 544 is stored with the associated text note 542. The notes tab 520 provides an indication to the user that it is in the notes portion of the application identified in the identification block 505.

Referring back to FIG. 3, a communicate module 428 communicates the status of the voice note between the recorder and the top-level application. Thus, the top-level application can update the status of the voice recording for display to the user.

A size module 429 determines the current size of the voice note. A size operation determines whether the voice note exceeds a size limitation, i.e. one of the specifications received by the receive module 418. If the size operation 430 determines that the size of the voice note does exceed the size limitation, operational flow branches "YES" to an end module 434. The end module 434 stops recording the voice note and writes the voice note and associated data in the format and to the location specified by the receive module 418.

If the size operation 431 determines that the size of the voice note does not exceed the size limitation, operational flow branches "NO" to a button operation 431. The button operation 431 determines if the record button is still pressed, i.e. the user is still recording a voice note. If the button operation 431 determines that the record button is still pressed, the continue module 432 continues to record the voice note and operational flow branches "YES" to the size module 429. Thus, the loop through the size module 429 and the continue module 432 continues until the size of the voice note exceeds the size limitation or until the user stops pressing, or holding down, the record button. If the button operation 431 determines that the button is no longer pressed, operational flow branches "NO" to the end module 434.

Operational flow continues to a data module 436. The data module 436 communicates the data information, i.e. file type and location, to the top-level application for later retrieval by the user through the top-level application. Operational flow ends at block 440.

Referring back to the power-up operation 412, if the power-up operation 412 determines that the activation of the record button was a power-up event, i.e. the device was off until the record button was pressed, operational flow branches "YES" to the trigger module 421. Operational flow proceeds as described above. Thus the embedding system 400 assumes that if the computing system was powered on by the record button, the user does not want the voice note associated with the data present within the top-level application, because the application was left at the top-level by the user prior to power-down. Thus, the user probably does not want the voice note associated with that data.

The operational flow chart depicted in FIG. 4 may best be understood in terms of application examples. In a first application example, a user is currently running a contact manager application on a palm-sized computer and has a particular contact open. Operational flow begins at block 402. The user presses the record button and begins recording directions to the contact's place of business. The detect operation 406 detects the button press and operational flow branches "YES" to the record module 408. The record module 408 begins recording the directions from the user. The buffer module 410 temporarily stores the recording to a temporary location. The power-up operation 412 determines that this was not a power-up event and operational flow branches "NO" to the top-level module 414.

The top-level module 414 determines that the contact manager is the toplevel application. The aware operation 416 determines that the contact manager is a voice-aware application. Operational flow branches "YES" to the receive module 418. The receive module 418 receives recording specifications regarding the size limit, file location, and file format from the contact manager. The embed module 419 embeds the voice note within the particular contact information that is currently open. The lock module 420 locks the connection between the recorder and the contact manager, so that even if the user switches to his calendar at this point, or some other application, the voice note will be embedded within the particular contact that was open at the time the recording began.

The write module 424 begins to write the buffered voice data while still continuing to record the voice note. The modify module 426 modifies the user interface on the contact module. The user interface is switched to a note interface and a voice record toolbar is brought up. The user interface also displays a status bar to give an indication to the user that the voice note is being recorded and the relative length of the voice note.

The communicate module 428 communicates the status between the recorder and the contacts manager, so that the contact manager can continually update the status bar and indicate to the user when recording has ended. The size module 429 determines the current size of the voice note. The size operation 430 determines that the current size has not exceeded the size limit and operational flow branches "NO" to the button operation 431. The button operation 431 determines that the record button is still pressed and operational flow branches "YES" to the continue module 432. The continue module 432 continues to record the voice note. The operational flow loops back to the size module 429. The size module 429 determines the current size of the voice note. The size operation 430 determines the current size has exceeded the size limit and operational flow branches "YES" to the end module 434. The end module 434 ends the recording. The data module 436 communicates the data information to the contact manager. The contact manager displays a speaker icon in the contact information, indicating a voice note to the user. The operational flow ends at 440.

In a second application example, operational flow proceeds as described above for the first application example from the detect module 404 through the button operation 431, except that during the loop back, the size limit is not exceeded but the user lets go of the record button. In this second application example, the button operation 431 determines that the button is no longer pressed. Operational flow branches "NO" to the end module 434 and operational flow proceeds as described above for the first application example.

In a third application example, the user is playing solitaire. The user presses the record button. Operational flow proceeds as described above for the first application example from the detect module 404 to the aware operation 416. The aware operation 416 determines that solitaire is not voice-aware. Operational flow branches "NO" to the trigger module 421. The trigger module 421 begins execution of the voice recording application. Operational flow branches to the specifications module 422. The specification module 422 receives recording specifications regarding the size limit, file location, and file format from the voice recording application. Operational flow branches to the lock module 420 and operational flow proceeds as described above. It is noted that the embed module 419 still embeds the voice data, even though the voice data is the only data present in the file associated with the voice recording application.

In a fourth application example, the user shuts off the device after using the contact module. Later, the user picks up the device and records a note regarding a meeting he has tomorrow. Operational flow proceeds as described above in the first application example from the detect module 404 to the power-up operation 412. The power-up operation 412 determines that the record button was pressed to power-on the device. Operational flow branches "YES" to the trigger module 421. Operational flow proceeds as described in the third application example above. It is noted that the embedding system 400 assumed that, even though the top-level application was voice-aware, the user did not want the voice note associated with the particular contact that was open in the contact manager.

The logical operations of the various embodiments illustrated herein are implemented (1) as a sequence of computer implemented steps or program modules running on a computing system and/or (2) as interconnected logic circuits or circuit modules within the computing system. The implementation is a matter of choice dependent on the performance requirements of the computing system implementing the invention. Accordingly, the logical operations making up the embodiments of the present invention described herein are referred to variously as operations, steps, engines, or modules.

The various embodiments described above are provided by way of illustration only and should not be construed to limit the invention. Those skilled in the art will readily recognize various modifications and changes that may be made to the present invention without following the example embodiments and applications illustrated and described

The invention claimed is:

1. A method in a computing system for modifying a user interface displayed on a display device, the method comprising:

receiving an indication from the computing device to modify the user interface of a first currently running application;

in response to receiving the indication, activating a second application, separate from the first currently running application, wherein the second application modifies the user interface of the first currently running application by:

displaying an identification block identifying the first currently running application;

displaying a record toolbar;

displaying a notepad; and displaying a note tab, wherein the record toolbar, the notepad, and the note tab are all displayed within the user interface of the first currently running application.

2. A method according to claim 1, wherein the step of displaying a record toolbar includes displaying a record button, a stop button, a play button, a fast forward button, and a rewind button.

3. A method according to claim 2, wherein the step of displaying a record toolbar further includes displaying a status bar indicating a relative length of a recording.

4. A method according to claim 1, wherein the step of displaying the note pad includes displaying both text data and an icon referring to an embedded voice note.

5. A method according to claim 1, wherein the step of displaying a note tab includes displaying the note tab to provide an indication to a user that the user is in a record portion of the first currently running application.

6. A display device having rendered thereon a user interface for displaying an embedded voice note, wherein the user interface comprises:

a user interface displayed by a first currently running application, wherein the user interface is modified via a second application that is separate from the first currently running application, to display:

an identification block;

a record tool bar;

a note pad defining an area in which both text data and an icon are positioned, wherein the icon refers to an embedded voice note, and wherein the voice note is playable by selecting the icon; and a note tab.

7. A display device according to claim 6, wherein the identification block includes information regarding the first currently running application.

8. A display device according to claim 6, wherein the record tool bar includes a record button, a stop button, a play button, a fast forward button, and a rewind button.

9. A display device according to claim 8, wherein the record toolbar further includes a status bar indicating a relative length of a recording.

10. A display device according to claim 6, wherein the note tab includes an indication to a user that the user is in a record portion of the first currently running application.

* * * * *